(12) United States Patent
Kamiya et al.

(10) Patent No.: US 10,348,751 B2
(45) Date of Patent: Jul. 9, 2019

(54) DEVICE, SYSTEM AND METHOD FOR EXTRACTION OF MALICIOUS COMMUNICATION PATTERN TO DETECT TRAFFIC CAUSED BY MALWARE USING TRAFFIC LOGS

(71) Applicant: NIPPON TELEGRAPH AND TELEPHONE CORPORATION, Chiyoda-ku (JP)

(72) Inventors: Kazunori Kamiya, Musashino (JP); Kazufumi Aoki, Musashino (JP); Kensuke Nakata, Musashino (JP); Tohru Sato, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 15/548,263

(22) PCT Filed: Feb. 3, 2016

(86) PCT No.: PCT/JP2016/053262
§ 371 (c)(1),
(2) Date: Aug. 2, 2017

(87) PCT Pub. No.: WO2016/125837
PCT Pub. Date: Aug. 11, 2016

(65) Prior Publication Data
US 2018/0020014 A1    Jan. 18, 2018

(30) Foreign Application Priority Data
Feb. 4, 2015    (JP) .................................. 2015-020156

(51) Int. Cl.
*G06F 12/14* (2006.01)
*G06F 12/16* (2006.01)
(Continued)

(52) U.S. Cl.
CPC .......... *H04L 63/1425* (2013.01); *G06F 21/56* (2013.01); *H04L 63/1416* (2013.01); *G06F 21/556* (2013.01)

(58) Field of Classification Search
CPC .. H04L 63/1425; H04L 63/1416; G06F 21/56
(Continued)

(56) References Cited

U.S. PATENT DOCUMENTS 7,269,851 B2 * 9/2007 Ackroyd ............... G06F 21/552
                                                    713/188
7,500,266 B1    3/2009 Vukelich et al.
(Continued)

FOREIGN PATENT DOCUMENTS

EP    2 661 049 A2    11/2013
EP    2 661 049 A3    11/2013
(Continued)

OTHER PUBLICATIONS

International Search Report dated Apr. 12, 2016, in PCT/JP2016/053262 filed Feb. 3, 2016.
(Continued)

*Primary Examiner* — Haresh N Patel
(74) *Attorney, Agent, or Firm* — Oblon, McClelland, Maier & Neustadt, L.L.P.

(57) ABSTRACT

A malicious communication pattern extraction device includes: a statistical value calculation unit that calculates a statistical value for an appearance frequency of each of plural communication patterns, from a traffic log obtained from traffic caused by malware, and a traffic log obtained from traffic in a predetermined communication environment; a malicious list candidate extraction unit that compares between the appearance frequency of the traffic logs for each of the communication patterns, based on the calculated statistical value, and extracts the communication
(Continued)

pattern as the malicious communication pattern when a difference between both of the appearance frequencies is equal to or more than a predetermined threshold; and a threshold setting unit that sets a threshold so that an erroneous detection rate probability of erroneously detecting the traffic caused by malware and a detection rate probability of detecting the traffic caused by malware is equal to or more than a certain value.

5 Claims, 15 Drawing Sheets

(51) Int. Cl.
*H04L 29/06* (2006.01)
*G06F 21/56* (2013.01)
*G06F 21/55* (2013.01)

(58) Field of Classification Search
USPC .......................................................... 726/23
See application file for complete search history.

(56) References Cited

U.S. PATENT DOCUMENTS

| | | | |
|---|---|---|---|
| 7,523,016 B1 | 4/2009 | Surdulescu et al. | |
| 8,302,193 B1 | 10/2012 | Gardner et al. | |
| 2005/0251860 A1 | 11/2005 | Saurabh et al. | |
| 2007/0011745 A1 | 1/2007 | Mitomo et al. | |
| 2007/0136455 A1 | 6/2007 | Lee et al. | |
| 2007/0240217 A1* | 10/2007 | Tuvell | G06F 21/56 726/24 |
| 2008/0005782 A1* | 1/2008 | Aziz | G06F 9/45537 726/3 |
| 2008/0141371 A1* | 6/2008 | Bradicich | G06F 21/552 726/23 |
| 2009/0064333 A1 | 3/2009 | Saurabh et al. | |
| 2010/0169972 A1* | 7/2010 | Kuo | G06F 21/564 726/23 |
| 2011/0093951 A1* | 4/2011 | Aziz | G06F 21/552 726/24 |
| 2011/0099633 A1* | 4/2011 | Aziz | G06F 21/568 726/24 |
| 2011/0107024 A1* | 5/2011 | Bish | G11B 5/00813 711/111 |
| 2011/0126286 A1* | 5/2011 | Nazarov | G06F 21/564 726/24 |
| 2011/0219452 A1* | 9/2011 | Porter | H04L 63/1425 726/23 |
| 2012/0239940 A1* | 9/2012 | Chabanne | G06F 21/32 713/186 |
| 2012/0266245 A1* | 10/2012 | McDougal | G06F 21/567 726/24 |
| 2012/0297485 A1* | 11/2012 | Maeda | G06F 21/52 726/23 |
| 2012/0331553 A1* | 12/2012 | Aziz | G06F 21/554 726/23 |
| 2013/0246604 A1* | 9/2013 | Pham | H04W 12/12 709/224 |
| 2013/0347114 A1 | 12/2013 | Altman et al. | |
| 2014/0047544 A1 | 2/2014 | Jakobsson | |
| 2014/0283076 A1* | 9/2014 | Muttik | G06F 21/554 726/24 |
| 2015/0096022 A1* | 4/2015 | Vincent | G06F 21/566 726/23 |
| 2016/0226904 A1* | 8/2016 | Bartos | H04L 63/1433 726/23 |

FOREIGN PATENT DOCUMENTS

| | | |
|---|---|---|
| JP | 2007-13343 A | 1/2007 |
| JP | 5009244 B2 | 8/2012 |
| JP | 5038888 B2 | 10/2012 |

OTHER PUBLICATIONS

Kamiya et al., "Firewall Log o Mochiita Malware Kansen Tanmatsu no Kenchi Shuho", Dai 77 Kai (Heisei 27 Nen). Proceedings of the National Convention of Information Processing Society of Japan, (2015), 4E-03, pp. 3-433 to 3-434.

Nakata et al., "A Method of Extracting Common Malware Communication Patterns from Dynamic Analysis Result", Computer Security Symposium, (2015), 11 pages (with English Abstract).

Perdisci et al., "Behavioral Clustering of HTTP-Based Malware and Signature Generation Using Malicious Network Traces", NDSI, (2010), 14 pages.

Shenk. "Sorting Through the Noise", SANS Eighth Annual 2012 Log and Event Management Survey Results, SANS Institute InfoSec Reading Room (2012), 17 pages.

Extended European Search Report dated Jun. 14, 2018 in Patent Application No. 16746668.9, 6 pages.

Office Action dated Jun. 5, 2018 in Japanese Patent Application No. 2016-573407 (with unedited computer generated English translation), 5 pages.

Narudin, F.A. et al. "Evaluation of machine learning classifiers for mobile malware detection", Soft Computing, vol. 20, XP035884223, 2016, pp. 343-357.

Tegeler, F. et al. "BotFinder: Finding Bots in Network Traffic Without Deep Packet Inspection", Co-NEXT'12, ACM, XP058010446, Dec. 2012, pp. 349-360.

\* cited by examiner

FIG.3

| NUMBER | FIELD IN TRAFFIC LOG |
|---|---|
| 1 | TRANSMISSION SOURCE IP ADDRESS |
| 2 | DESTINATION IP ADDRESS |
| 3 | PROTOCOL NUMBER |
| 4 | TRANSMISSION SOURCE PORT NUMBER |
| 5 | DESTINATION PORT NUMBER |
| 6 | FLOW COLLECTING TIME |
| 7 | FLOW DURATION TIME |
| 8 | TRANSMISSION BYTES |
| 9 | RECEPTION BYTES |
| 10 | NUMBER OF TRANSMISSION PACKETS |
| 11 | NUMBER OF RECEPTION PACKETS |
| 12 | URL |
| 13 | URL Path |
| 14 | URL Query String |
| 15 | HTTP User Agent |
| 16 | HTTP content-type |
| 17 | DNS Query Type |
| 18 | DNS Query Name |
| 19 | DNS Response Code |
| ⋮ | ⋮ |

FIG.4

| NUMBER | FIELD APPLICABLE TO TRAFFIC LOG | EXPLANATION |
|---|---|---|
| 1 | ORGANIZATION NAME | SOLVABLE USING DESTINATION IP ADDRESS AND MaxMind's GeoIP, etc |
| 2 | AS NUMBER | SOLVABLE USING DESTINATION IP ADDRESS AND ROUTING TABLE |
| 3 | IP Prefix | SOLVABLE USING DESTINATION IP ADDRESS AND ROUTING TABLE |
| 4 | COUNTRY NAME | SOLVABLE USING DESTINATION IP ADDRESS AND MaxMind's GeoIP, etc |
| 5 | APPLICATION NAME | SOLVABLE USING CORRESPONDENCE TABLE BETWEEN DESTINATION PORT NUMBER AND APPLICATION TABLE |
| 6 | FLOW COUNT | FLOW IS COUNTABLE WHEN PLURALITY OF PIECES OF FLOW INFORMATION ARE COLLECTED |
| ⋮ | ⋮ | ⋮ |

FIG.5

| MALWARE IDENTIFIER | PROTOCOL | DESTINATION PORT | DESTINATION IP ADDRESS | DESTINATION ORGANIZATION | TRANSMISSION SOURCE PORT | TRANSMISSION BYTES | URL | DNS Query Name |
|---|---|---|---|---|---|---|---|---|
| M1 | UDP | 53 | 192.0.2.0 | A | 1037 | 20 | — | www.example1.co.jp |
| M1 | UDP | 53 | 192.0.2.0 | A | 1038 | 25 | — | www.example1.co.jp |
| M1 | UDP | 53 | 192.0.2.0 | A | 1039 | 20 | — | www.example1.co.jp |
| M1 | TCP | 80 | 192.0.2.1 | B | 1035 | 128 | http://www.example2.co.jp/ | — |
| M1 | TCP | 80 | 192.0.2.1 | B | 1035 | 128 | http://www.example2.co.jp/ | — |
| M1 | UDP | 16471 | 192.0.2.2 | C | 1056 | 16 | — | — |
| M1 | UDP | 16471 | 192.0.2.3 | C | 1062 | 16 | — | — |
| M1 | UDP | 16471 | 192.0.2.4 | D | 1056 | 16 | — | — |

FIG.6

| TRANS-MISSION SOURCE IP ADDRESS | PROTOCOL | DESTINA-TION PORT | DESTINA-TION IP ADDRESS | DESTINA-TION ORGANIZA-TION | TRANS-MISSION SOURCE PORT | TRANS-MISSION BYTES | URL | DNS Query Name |
|---|---|---|---|---|---|---|---|---|
| 192.1.1.1 | UDP | 53 | 192.0.2.0 | A | 1037 | 20 | - | www.example1.co.jp |
| 192.1.1.1 | TCP | 80 | 192.0.2.0 | A | 1038 | 25 | http://www.example1.co.jp/ | - |
| 192.1.1.1 | TCP | 80 | 192.0.2.1 | B | 1039 | 20 | http://www.example2.co.jp/ | - |
| 192.1.1.1 | TCP | 80 | 192.0.2.1 | B | 1035 | 128 | http://www.example2.co.jp/ | - |
| 192.1.1.1 | TCP | 80 | 192.0.2.1 | B | 1035 | 256 | http://www.example2.co.jp/api/ | - |
| 192.1.1.1 | TCP | 80 | 192.0.2.2 | C | 1056 | 16 | http://www.example3.co.jp/ | - |
| 192.1.1.1 | TCP | 80 | 192.0.1.0 | E | 1062 | 16 | http://www.example.co.jp/ | - |

FIG.7

| TRAFFIC FIELD | VALUE | OCCUR-RENCE RATE | NUMBER OF PIECES OF MALWARE/ NUMBER OF TERMINALS | NUMBER OF TIMES OF OCCUR-RENCE |
|---|---|---|---|---|
| PROTOCOL | UDP | 0.8 | 80 | 160 |
| | TCP | 1.0 | 100 | 1000 |
| PROTOCOL + DESTINATION PORT | UDP53 | 0.8 | 80 | 160 |
| | UDP80 | 0.3 | 30 | 30 |
| | UDP16471 | 0.3 | 30 | 300 |
| | TCP80 | 1.0 | 100 | 1000 |
| DESTINATION IP ADDRESS | 192.0.2.0 | 0.8 | 80 | 160 |
| | 192.0.2.1 | 0.1 | 10 | 10 |
| | 192.0.2.2 | 0.2 | 20 | 20 |
| DESTINATION ORGANIZATION | A | 0.8 | 80 | 160 |
| | B | 0.1 | 10 | 10 |
| | C | 0.2 | 20 | 20 |
| TRANSMISSION SOURCE PORT | 30001 | 0.01 | 1 | 100 |
| | 30002 | 0.5 | 50 | 100 |
| TRASMISSION BYTES | 100 | 0.8 | 80 | 160 |
| | 200 | 0.1 | 10 | 10 |
| | 300 | 0.2 | 20 | 20 |
| URL | http://www.example1.co.jp/ | 0.8 | 80 | 160 |
| | http://www.example2.co.jp/ | 0.1 | 10 | 10 |
| | http://www.example3.co.jp/ | 0.2 | 20 | 20 |
| DNS Query Name | www.example1.co.jp | 0.8 | 80 | 160 |
| | www.example2.co.jp | 0.1 | 10 | 10 |
| | www.example3.co.jp | 0.2 | 20 | 20 |

FIG.8

| TRAFFIC FIELD | VALUE | OCCUR-RENCE RATE | NUMBER OF PIECES OF MALWARE | NUMBER OF TIMES OF OCCUR-RENCE | OCCUR-RENCE RATE | NUMBER OF TERMINALS | NUMBER OF TIMES OF OCCUR-RENCE |
|---|---|---|---|---|---|---|---|
| PROTOCOL | UDP | 0.8 | 80 | 160 | 0.8 | 80 | 160 |
|  | TCP | 1.0 | 100 | 1000 | 1.0 | 100 | 1000 |
| PROTOCOL + DESTINATION PORT | UDP53 | 0.8 | 80 | 160 | 0.8 | 80 | 160 |
|  | UDP80 | 0.3 | 30 | 30 | - | - | - |
|  | UDP16471 | 0.3 | 30 | 300 | - | - | - |
|  | TCP80 | 1.0 | 100 | 1000 | 1.0 | 100 | 1000 |
| DESTINATION IP ADDRESS | 192.0.2.0 | 0.8 | 80 | 160 | 0.8 | 80 | 160 |
|  | 192.0.2.1 | 0.1 | 10 | 10 | 0.1 | 10 | 10 |
|  | 192.0.2.2 | 0.2 | 20 | 20 | 0.001 | 1 | 10 |
| DESTINATION ORGANIZATION | A | 0.8 | 80 | 160 | 0.8 | 80 | 160 |
|  | B | 0.1 | 10 | 10 | 0.1 | 10 | 10 |
|  | C | 0.2 | 20 | 20 | 0.001 | 1 | 10 |
| TRANSMISSION SOURCE PORT | 30001 | 0.01 | 1 | 100 | 0.01 | 1 | 100 |
|  | 30002 | 0.5 | 50 | 100 | 0.5 | 50 | 100 |
| TRANSMISSION BYTES | 100 | 0.8 | 80 | 160 | 0.8 | 80 | 160 |
|  | 200 | 0.1 | 10 | 10 | 0.1 | 10 | 10 |
|  | 300 | 0.2 | 20 | 20 | 0.2 | 20 | 20 |
| URL | http://www.example1.co.jp/ | 0.8 | 80 | 160 | 0.8 | 80 | 160 |
|  | http://www.example2.co.jp/ | 0.1 | 10 | 10 | 0.1 | 10 | 10 |
|  | http://www.example3.co.jp/ | 0.2 | 20 | 20 | - | - | - |
| DNS Query Name | www.example1.co.jp | 0.8 | 80 | 160 | 0.8 | 80 | 160 |
|  | www.example2.co.jp | 0.1 | 10 | 10 | 0.1 | 10 | 10 |
|  | www.example3.co.jp | 0.2 | 20 | 20 | 0.2 | 20 | 20 |

FIG.9

| TRAFFIC FIELD | FEASIBILITY OF ADOPTING MALICIOUS LIST | MALICIOUS LIST |
|---|---|---|
| PROTOCOL | NG | — |
| PROTOCOL + DESTINATION PORT | OK | UDP80 |
| | | UDP16471 |
| DESTINATION IP ADDRESS | OK | 192.0.2.2 |
| DESTINATION ORGANIZATION | OK | C |
| TRANSMISSION SOURCE PORT | NG | — |
| TRANSMISSION BYTES | NG | — |
| URL | OK | http://www.example3.co.jp/ |
| DNS Query Name | NG | — |

FIG.10

| TRAFFIC FIELD | FEASIBILITY OF ADOPTING MALICIOUS LIST | THRESHOLD FOR NUMBER OF TIMES OF OCCURRENCE | THRESHOLD FOR NUMBER OF TYPES | MALICIOUS LIST |
|---|---|---|---|---|
| PROTOCOL | NG | — | — | — |
| PROTOCOL + DESTINATION PORT | OK | 10 | 2 | UDP80 |
| | | | | UDP16471 |
| DESTINATION IP ADDRESS | OK | 5 | 1 | 192.0.2.2 |
| DESTINATION ORGANIZATION | OK | 5 | 1 | C |
| TRANSMISSION SOURCE PORT | NG | - | - | — |
| TRANSMISSION BYTES | NG | - | - | — |
| URL | OK | 1 | 1 | http://www.example3.co.jp/ |
| DNS Query Name | NG | - | - | — |

FIG.11

| TRAFFIC FIELD | FEASIBILITY OF ADOPTING MALICIOUS LIST | THRESHOLD FOR NUMBER OF TIMES OF OCCUR-RENCE | THRESHOLD FOR NUMBER OF TYPES | DETECTABLE MALWARE IDENTIFIER | MALICIOUS LIST |
|---|---|---|---|---|---|
| PROTOCOL | NG | – | – | – | – |
| PROTOCOL + DESTINATION PORT | OK | 10 | 2 | M1, M2, M3, M4, M5 | UDP80 / UDP16471 |
| DESTINATION IP ADDRESS | OK | 5 | 1 | M6 | 192.0.2.2 |
| DESTINATION ORGANIZATION | OK | 5 | 1 | M6, M7 | C |
| TRANSMISSION SOURCE PORT | NG | – | – | – | – |
| TRANSMISSION BYTES | NG | – | – | – | – |
| URL | OK | 1 | 1 | M8, M9, M10 | http://www.example3.co.jp/ |
| DNS Query Name | NG | – | – | – | – |

| TRAFFIC FIELD | THRESHOLD FOR NUMBER OF TIMES OF OCCUR-RENCE | THRESHOLD FOR NUMBER OF TYPES | MALICIOUS LIST |
|---|---|---|---|
| PROTOCOL + DESTINATION PORT | 10 | 2 | UDP80 |
| | | | UDP16471 |
| DESTINATION ORGANIZATION | 5 | 1 | C |
| URL | 1 | 1 | http://www.example3.co.jp/ | ically # DEVICE, SYSTEM AND METHOD FOR EXTRACTION OF MALICIOUS COMMUNICATION PATTERN TO DETECT TRAFFIC CAUSED BY MALWARE USING TRAFFIC LOGS

FIELD

The present invention relates to a malicious communication pattern extraction device, a malicious communication pattern extraction system, a malicious communication pattern extraction method, and a malicious communication pattern extraction program.

BACKGROUND

Traditional countermeasures against cyber-attacks include inlet measures using antivirus software and the like. However, such countermeasures cannot completely prevent infection, and the importance of outlet measures that prevents the damage of malware infection from spreading has been increasing. An effective way to detect an infected terminal is to analyze the log of the terminal or the network device. In recent years, an increasing number of enterprises take outlet measures by implementing a security information and event management (SIEM).

In the outlet measures, an infected terminal is detected and the malware infected terminal is separated from the network. A method of specifying the malware infected terminal includes a method of extracting a specific uniform resource locator (URL) as a blacklist by analyzing the behavior of malware, and matching the blacklist with the network log. For example, in a method of specifying a terminal communicating with an Internet Protocol (IP) address in a blacklist as the destination, the terminal is specified using the blacklist relating to IP addresses of communication destinations specific to malware.

CITATION LIST

Patent Literature

Patent Literature 1: Japanese Patent No. 5009244
Non Patent Literature 1: SANS Eighth Annual 2012 Log and Event Management Survey Results: Sorting Through the Noise, [online], [searched on Oct. 31, 2014], Internet <URL: http://www.sans.org/reading-room/whitepapers/analyst/eighth-annual-2012-log-event-management-survey-results-sorting-noise-35230>
Non Patent Literature 2: R. Perdisci and others, "Behavioral Clustering of HTTP-Based Malware and Signature Generation Using Malicious Network Traces", NSDI, April 2010.

SUMMARY

Technical Problem

However, in recent years, malware carries out various communications. Thus, when the URL of the communication destination is simply extracted, it often causes erroneous detection, and a range of detectable malware does not increase. In fact, certain malware accesses famous sites to confirm external communication. This communication and normal communication cannot be distinguished from each other. Moreover, certain malware does not perform Web access and communicates externally using a port number that is not used in normal communication. This cannot be detected by matching with a malicious URL.

When erroneous detection occurs, an operator needs to analyze the problem manually. Thus, it takes time to specify the malware infected terminal, and the operational cost will be increased. Consequently, it is preferable to detect the malware infected terminal while reducing an erroneous detection as much as possible. The object of the present invention is to extract a malicious communication pattern with less erroneous detection.

Solution to Problem

To solve a problem and to achieve an object, a malicious communication pattern extraction device that extracts a malicious communication pattern to detect traffic caused by malware, the malicious communication pattern extraction device, includes: a statistical value calculation unit that calculates a statistical value for an appearance frequency of each of a plurality of communication patterns that is a combination of a field and a value, from a first traffic log obtained from the traffic caused by malware, and a second traffic log obtained from traffic in a predetermined communication environment; an extraction unit that compares between the appearance frequency of the first traffic log and the appearance frequency of the second traffic log for each of the communication patterns, based on the statistical value calculated by the statistical value calculation unit, and extracts the communication pattern as the malicious communication pattern when a difference between both of the appearance frequencies is equal to or more than a predetermined threshold; and a threshold setting unit that sets a threshold to detect whether the traffic is caused by malware, when the malicious communication pattern extracted by the extraction unit is applied, the threshold being a threshold for number of times the communication pattern is matched with at least one type of the malicious communication pattern, or a threshold for number of types of the malicious communication pattern when the communication pattern is matched with the malicious communication pattern, and the threshold being set so that an erroneous detection rate that is probability of erroneously detecting the traffic caused by malware is equal to or less than a certain value as well as a detection rate that is probability of detecting the traffic caused by malware is equal to or more than a certain value.

A malicious communication pattern extraction system, includes: a malicious communication pattern extraction device that extracts a malicious communication pattern to detect traffic caused by malware; a first network that generates a first traffic log obtained from the traffic caused by malware; and a second network that generates a second traffic log obtained from traffic in a predetermined communication environment, wherein the malicious communication pattern extraction device includes a statistical value calculation unit that calculates a statistical value for an appearance frequency of each of a plurality of communication patterns that is a combination of a field and a value, from the first traffic log and the second traffic log; an extraction unit that compares between the appearance frequency of the first traffic log and the appearance frequency of the second traffic log for each of the communication patterns, based on the statistical value calculated by the statistical value calculation unit, and extracts the communication pattern as the malicious communication pattern when a difference between both of the appearance frequencies is equal to or more than a predetermined threshold; and a threshold setting unit that sets a threshold to detect whether the traffic is caused by malware, when the malicious communication pattern extracted by the extraction unit is applied, the threshold being a threshold for number of times the communication pattern is matched with at least one type of the malicious communication pattern, or a threshold for number of types of the malicious communication pattern when the communication pattern is matched with the malicious communication pattern, and the threshold being set so that an erroneous detection rate that is probability of erroneously detecting the traffic caused by malware is equal to or less than a certain value as well as a detection rate that is probability of detecting the traffic caused by malware is equal to or more than a certain value.

A malicious communication pattern extraction method that extracts a malicious communication pattern to detect traffic caused by malware, the malicious communication pattern extraction method, includes: generating first traffic log that generates a first traffic log obtained from the traffic caused by malware; generating second traffic log that generates a second traffic log obtained from traffic in a predetermined communication environment; calculating statistical value that calculates a statistical value for an appearance frequency of each of a plurality of communication patterns that is a combination of a field and a value, from the first traffic log and the second traffic log; extracting that compares between the appearance frequency of the first traffic log and the appearance frequency of the second traffic log for each of the communication patterns, based on the statistical value calculated by the calculating statistical value, and extracts the communication pattern as the malicious communication pattern when a difference between both of the appearance frequencies is equal to or more than a predetermined threshold; and setting threshold that sets a threshold to detect whether the traffic is caused by malware, when the malicious communication pattern extracted by the extracting is applied, the threshold being a threshold for number of times the communication pattern is matched with at least one type of the malicious communication pattern, or a threshold for number of types of the malicious communication pattern when the communication pattern is matched with the malicious communication pattern, and the threshold being set so that an erroneous detection rate that is probability of erroneously detecting the traffic caused by malware is equal to or less than a certain value as well as a detection rate that is probability of detecting the traffic caused by malware is equal to or more than a certain value.

A malicious communication pattern extraction program that causes a computer to extract a malicious communication pattern to detect traffic caused by malware, the malicious communication pattern extraction program, includes: a step of calculating statistical value that calculates a statistical value for an appearance frequency of each of a plurality of communication patterns that is a combination of a field and a value, from a first traffic log obtained from the traffic caused by malware and a second traffic log obtained from traffic in a predetermined communication environment; a step of extracting that compares between the appearance frequency of the first traffic log and the appearance frequency of the second traffic log for each of the communication patterns, based on the statistical value calculated by the step of calculating statistical value, and extracts the communication pattern as the malicious communication pattern when a difference between both of the appearance frequencies is equal to or more than a predetermined threshold; and a step of setting threshold that sets a threshold to detect whether the traffic is caused by malware, when the malicious communication pattern extracted by the step of extracting is applied, the threshold being a threshold for number of times the communication pattern is matched with at least one type of the malicious communication pattern, or a threshold for number of types of the malicious communication pattern when the communication pattern is matched with the malicious communication pattern, and the threshold being set so that an erroneous detection rate that is probability of erroneously detecting the traffic caused by malware is equal to or less than a certain value as well as a detection rate that is probability of detecting the traffic caused by malware is equal to or more than a certain value.

Advantageous Effects of Invention

According to the present invention, it is possible to extract a malicious communication pattern with less erroneous detection.

BRIEF DESCRIPTION OF DRAWINGS

FIG. 3 is a diagram illustrating an example of fields in a traffic log handled by the malicious communication pattern extraction device.

FIG. 4 is a diagram illustrating an example of fields applicable to the traffic log.

FIG. 5 is a diagram illustrating an example of traffic generated by malware.

FIG. 6 is a diagram illustrating an example of traffic generated in a network to be protected.

FIG. 7 is a diagram illustrating an example of statistical values for each of a plurality of traffic fields.

FIG. 8 is a diagram illustrating an example of statistical values for each of the traffic fields after the merge.

FIG. 9 is a diagram illustrating an example of a malicious list candidate.

FIG. 10 is a diagram illustrating an example of setting a threshold for the malicious list candidate.

FIG. 11 is a diagram illustrating an example of setting a malware identifier for the malicious list candidate.

DESCRIPTION OF EMBODIMENTS

Figure 1:
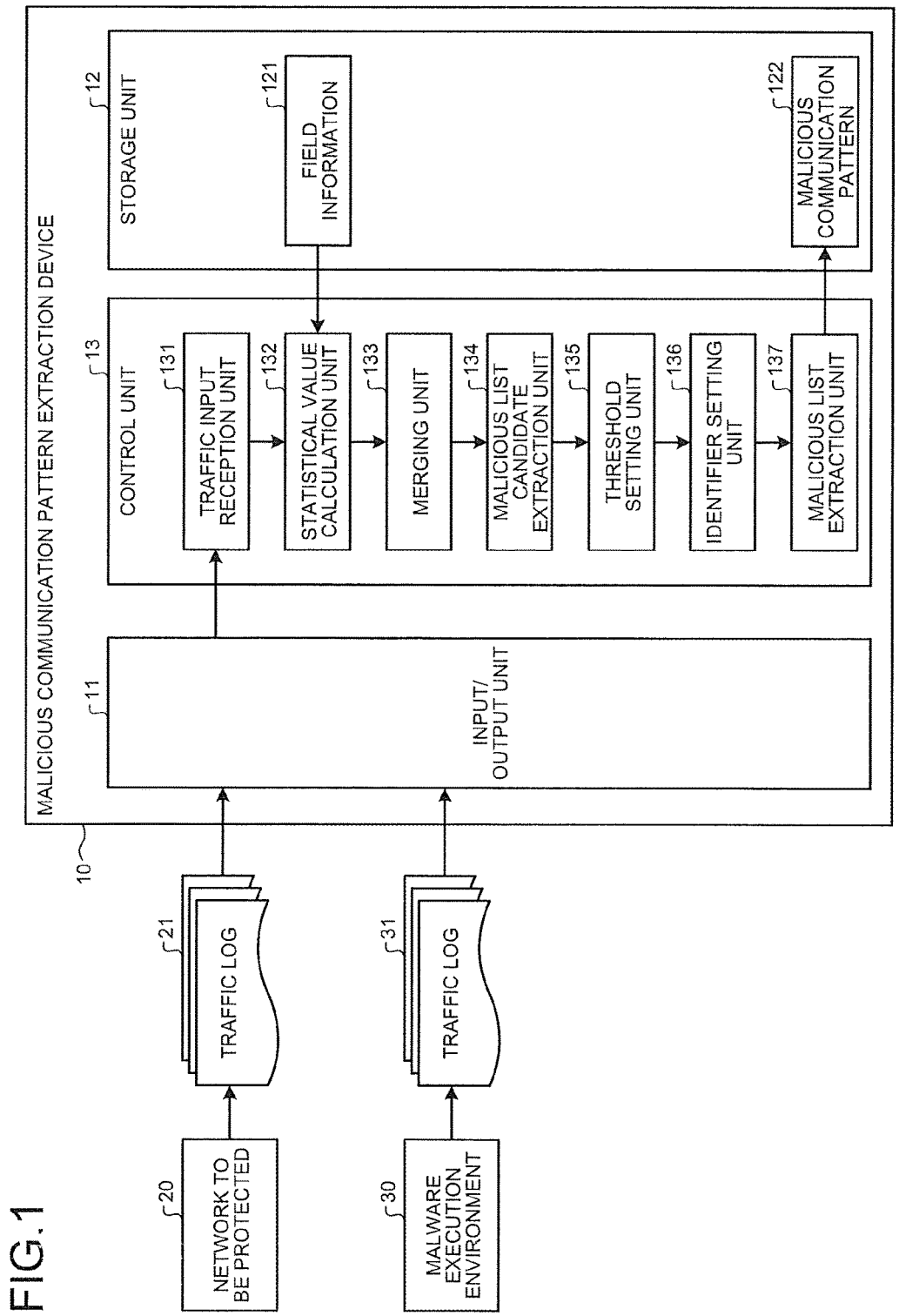
FIG. 1 is a diagram illustrating a configuration of a malicious communication pattern extraction device.

Hereinafter, a mode for carrying out the present invention (embodiment) will be described in detail with reference to the accompanying drawings. First, a configuration of a malicious communication pattern extraction device 10 of the present embodiment will be described with reference to FIG. 1. FIG. 1 is a diagram illustrating a configuration of a malicious communication pattern extraction device. It is to be noted that the present invention is not limited to the present embodiment.

The malicious communication pattern extraction device 10 includes an input/output unit 11, a storage unit 12, and a control unit 13. For example, the input/output unit 11 receives a traffic log 21 of a network to be protected 20, a traffic log 31 of a malware execution environment 30, and the like. In the following, the traffic log supplied to the malicious communication pattern extraction device 10 is the past traffic log. However, it is not limited thereto.

The malware execution environment 30 is a first network that generates the traffic log 31 that is a first traffic log obtained from the traffic caused by malware. The network to be protected is a second network that generates the traffic log 21 that is a second traffic log obtained from the traffic in a predetermined communication environment. The malicious communication pattern extraction device 10 extracts a malicious communication pattern to detect the traffic caused by malware. The malware execution environment 30, the network to be protected, and the malicious communication pattern extraction device 10 configure a malicious communication pattern extraction system.

Fields in a traffic log supplied to the input/output unit 11 will now be described. FIG. 3 is a diagram illustrating an example of fields in a traffic log handled by the malicious communication pattern extraction device. As illustrated in FIG. 3, the traffic log that is received by the input/output unit 11 and that is handled by the malicious communication pattern extraction device 10 includes a transmission source IP address, a destination IP address, a protocol number, a transmission source port number, transmission bytes, a URL, and the like.

The fields in the traffic log that can be actually obtained vary depending on a device and software used for obtaining the log. For example, in a network device such as a router and a switch, the fields are often limited to information on a transmission control protocol/internet protocol (TCP/IP) layer such as an IP address and a port number. On the other hand, when it is possible to store packet capture (PCAP) directly, more rich information such as Hypertext Transfer Protocol (HTTP) header information and application information can be obtained.

The traffic log may also include statistical information on the information in the traffic log and additional information in cooperation with external information. For example, the fields in FIG. 3 do not include an organization name of the destination. However, the organization name can be specified from the destination IP address and MaxMind's GeoIP (registered trademark). FIG. 4 is a diagram illustrating an example of fields applicable to the traffic log. As illustrated in FIG. 4, applicable fields include an organization name of the destination of the traffic, an autonomous system (AS) number, an IP prefix, a country name, an application name, number of flows included in the traffic, and the like. The external information includes a mapping database of IP addresses and names of countries and organizations by the MaxMind's GeoIP; a mapping database of IP addresses, AS numbers, and IP prefixes by the Border Gateway Protocol (BGP) routing information; a uniquely defined database, or the like.

The storage unit 12 stores therein field information 121 and a malicious communication pattern 122. The field information 121 is information on fields (such as a protocol number, a destination port number, a destination IP address, a transmission source port number, and transmission bytes) of traffic from which the communication pattern as illustrated in FIG. 3 is to be extracted. For example, with reference to the field information, the control unit 13 extracts values of the fields of the protocol number, the destination port number, the destination IP address, the transmission source port number, and the transmission bytes from the received traffic log, as a communication pattern.

Figure 2:
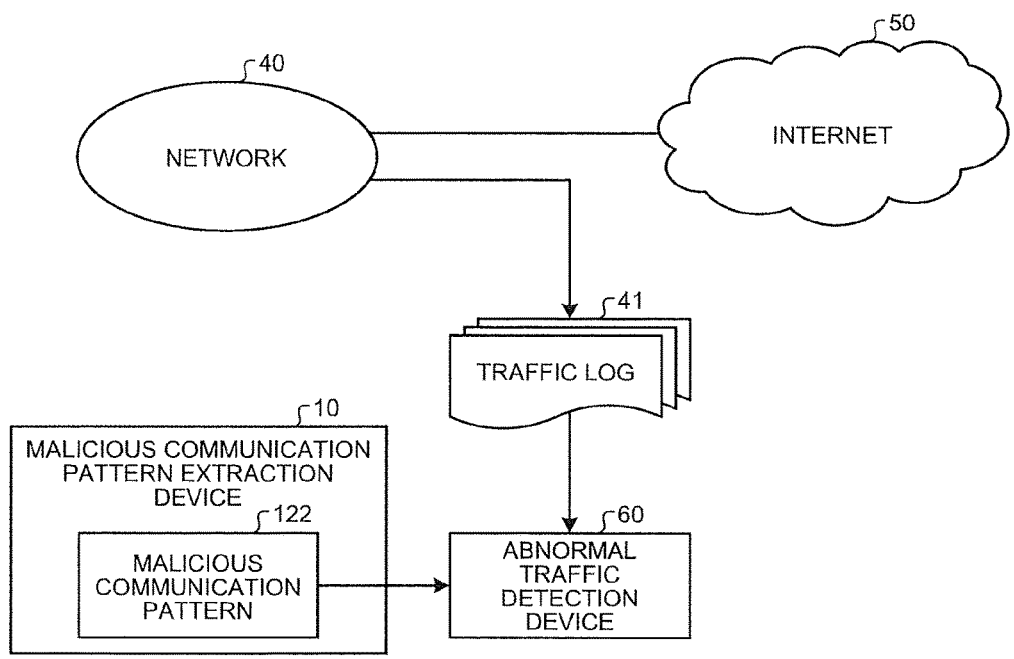
FIG. 2 is a diagram illustrating a configuration of an abnormal traffic detection system.

The malicious communication pattern 122 is a communication pattern used for detecting abnormal traffic, and is extracted by a process performed by the control unit 13. The details of the process will be described below. It is to be noted that the extracted malicious communication pattern 122 is used by an abnormal traffic detection system illustrated in FIG. 2. FIG. 2 is a diagram illustrating a configuration of an abnormal traffic detection system. As illustrated in FIG. 2, an abnormal traffic detection device 60 receives a traffic log 41 of a network 40 connected to Internet 50. Moreover, the abnormal traffic detection device 60 refers to the malicious communication pattern 122 extracted by the malicious communication pattern extraction device 10, and detects abnormal traffic from the traffic log 41.

The control unit 13 illustrated in FIG. 1 controls the entire malicious communication pattern extraction device 10. The control unit 13 includes a traffic input reception unit 131, a statistical value calculation unit 132, a merging unit 133, a malicious list candidate extraction unit 134, a threshold setting unit 135, an identifier setting unit 136, and a malicious list extraction unit 137.

The traffic input reception unit 131 receives an input of a traffic log from the input/output unit 11. The traffic input reception unit 131 receives a traffic log such as the traffic log 21 of the network to be protected 20 and the traffic log 31 of the malware execution environment 30.

The malware execution environment 30 is environment for making known malware to communicate intentionally. The traffic log 31 of the malware can be obtained from the malware execution environment. FIG. 5 is a diagram illustrating an example of traffic generated by malware. A malware identifier that can uniquely specify malware often takes the form of Sha1 hash value in a malware file. "M1" of the malware identifier in FIG. 5 indicates the Sha1 hash value. It is assumed that the traffic log illustrated in FIG. 5 includes information on the additional fields illustrated in FIG. 4.

The network to be protected 20 is a network in which abnormal traffic is to be detected. In a normal state, traffic caused by malware is not generated in the network to be protected 20. As illustrated in FIG. 6, in the network to be protected 20, a transmission source IP address is often used to uniquely identify a terminal. Similar to that in FIG. 5, it is assumed that the traffic log illustrated in FIG. 6 includes information on the additional fields illustrated in FIG. 4.

The statistical value calculation unit 132 calculates statistical value information as illustrated in FIG. 7, from the traffic log that is received by the traffic input reception unit 131 and to which additional field information and the like is applied. FIG. 7 is a diagram illustrating an example of statistical values for each of a plurality of traffic fields. The statistical value calculation unit 132 calculates a statistical value for the appearance frequency of each of a plurality of communication patterns that is a combination of a field and a value, from the traffic log 31 obtained from the traffic caused by malware and the traffic log 21 obtained from the traffic in a predetermined communication environment.

More specifically, as illustrated in FIG. 7, statistical values are calculated for each value of the field in the traffic log. Moreover, an example of the statistical values to be calculated includes occurrence rate, the number of pieces of malware or the number of terminals, the number of times of occurrence, and the like. The input traffic log from which the statistical values are to be calculated is the traffic log 21 of the network to be protected 20 as well as the traffic log 31 of the malware execution environment 30 illustrated in FIG. 1. However, in the traffic log 21, the number of terminals is calculated based on the transmission source IP address, as the number of transmission sources. In the traffic log 31, the number of pieces of malware is calculated based on the malware identifier, as the number of transmission sources.

To calculate the statistical values, a field to be calculated is first specified. In the example illustrated in FIG. 7, a plurality of optional fields that can be collected from the traffic may be specified as the field to be calculated. It is also possible to specify a combination of optional fields. In the example illustrated in FIG. 7, protocol, protocol+destination port, destination IP address, destination organization, transmission source port, transmission bytes, URL, Domain Name System (DNS) Query Name are specified.

When the fields are specified, statistical values are calculated for the specified field. A method of calculating the occurrence rate, the number of terminals or the number of pieces of malware, and the number of times of occurrence will be described. In the explanation, the number of terminals or the number of pieces of malware is explained as the number of occurrence.

First, the number of occurrence is the number obtained by counting the number of times of appearance of a combination of a certain field and a value from the traffic log, without allowing the duplication of terminals or malware. Next, the number of times of occurrence is the number obtained by counting the number of times of appearance of the combination of a certain field and a value from the traffic log, while allowing the duplication of terminals or malware. For example, when the traffic having the same combination of a field and a value has occurred multiple times in a single terminal, the number of occurrence is once, and the number of times of occurrence is multiple times. The occurrence rate is a value obtained by dividing the number of occurrence by the total number of terminals or the total number of pieces of malware. In the example in FIG. 7, the total number of terminals or the total number of pieces of malware is 100.

In this manner, the calculation methods of the statistical values can be expressed as follows.

The number of occurrence=the number of times of appearance of a combination of a certain field and a value (duplication of terminals or malware not allowed)

The number of times of occurrence=the number of times of appearance of a combination of a certain field and a value (duplication of terminals or malware allowed)

The occurrence rate=the number of occurrence/the total number of terminals or the total number of pieces of malware For example, in the example of FIG. 7, the number of times of appearance of the combination of the field of the destination IP address and the value of "192.0.2.0" in the traffic log is 160. The number of occurrence obtained by removing the duplication of terminals or malware from the above is 80. When 80 is divided by 100 that is the total number of terminals or the total number of pieces of malware, the occurrence rate is 0.8.

Upon calculating the statistical values from both the traffic log 21 of the network to be protected 20 and the traffic log 31 of the malware execution environment 30, as illustrated in FIG. 8, the merging unit 133 merges the calculation results. FIG. 8 is a diagram illustrating an example of statistical values for each of the traffic fields after the merge. The left columns in FIG. 8 indicating the occurrence rate, the number of pieces of malware, and the number of times of occurrence are the statistical values calculated from the traffic log 31 of the malware execution environment 30. The right columns in FIG. 8 indicating the occurrence rate, the number of terminals, and the number of times of occurrence are the statistical values calculated from the traffic log 21 of the network to be protected 20.

As illustrated in FIG. 8, with reference to the left columns of the occurrence rate, the number of pieces of malware, and the number of times of occurrence, if any of the values in the traffic fields of the network to be protected is the same as the values in the traffic fields of malware, the merging unit 133 adds the value in the right columns of the occurrence rate, the number of terminals, and the number of times of occurrence. Moreover, if none of the values in the traffic fields in the network to be protected is the same as the values in the traffic fields of malware, the merging unit 133 adds a hyphen. The merging unit 133 performs merging by repeating the above process on the fields and values.

Next, the malicious list candidate extraction unit 134 extracts a malicious list candidate, based on the merged statistical values. FIG. 9 is a diagram illustrating an example of a malicious list candidate. The malicious list candidate extraction unit 134 compares between the appearance frequency of the traffic log 21 and the appearance frequency of the traffic log 31 for each communication pattern, based on the statistical values calculated by the statistical value calculation unit 132. When a difference between both of the appearance frequencies is equal to or more than a predetermined threshold, the malicious list candidate extraction unit 134 extracts the communication pattern as the malicious communication pattern. For example, the malicious list candidate extraction unit 134 refers to the occurrence rate among the merged statistical values illustrated in FIG. 8. When the value of the occurrence rate in the malware execution environment at the left side is sufficiently large enough, and the value of the occurrence rate in the network to be protected at the right side is sufficiently small enough, the malicious list candidate extraction unit 134 extracts the value. The above described "sufficiently large enough" and "sufficiently small enough" are determined by setting a threshold relative to the statistical value in advance. If at least one value is extracted from the traffic fields, the malicious list candidate extraction unit 134 assigns OK to the "feasibility of adopting the malicious list". If no value can be extracted from the traffic fields, the malicious list candidate extraction unit 134 assigns NG to the "feasibility of adopting the malicious list". The malicious list candidate extraction unit 134 extracts a malicious list candidate by repeating the above process on the fields and values.

The threshold setting unit 135 then sets a threshold for the extracted malicious list candidate. FIG. 10 is a diagram illustrating an example of setting a threshold for a malicious list candidate. When the malicious communication pattern extracted by the malicious list candidate extraction unit 134 is applied, the threshold setting unit 135 sets a threshold to detect whether the traffic is caused by malware. The threshold is a threshold for the number of times the communication pattern is matched with at least one type of the malicious communication pattern, or a threshold for the number of types of the malicious communication patterns when the communication pattern is matched with the malicious communication pattern. The threshold is set so that the erroneous detection rate that is the probability of erroneously detecting the traffic caused by malware is equal to or less than a certain value as well as the detection rate that is the probability of detecting the traffic caused by malware is equal to or more than a certain value.

More specifically, the threshold setting unit 135 extracts, using a plurality of thresholds that have been specified in advance, a threshold that is set so that the detection rate relative to the traffic caused by malware is equal to or more than a certain value, and the erroneous detection rate relative to the traffic in the network to be protected is equal to or less than a certain value, among the malicious list candidates in which the feasibility of adopting the malicious list is assigned OK. The detection rate and the erroneous detection rate can be calculated as follows.

> Detection rate=the number of pieces of malware detected using malicious list candidates and thresholds/total number of pieces of malware > Erroneous detection rate=the number of terminals detected using malicious list candidates and thresholds/total number of terminals The threshold setting unit 135 sets the threshold for the malicious list candidate by repeating the above process on the malicious list candidates. For example, in the example of FIG. 10, the threshold for the number of times of occurrence of the traffic with the destination organization "C" is set to five. Thus, FIG. 10 indicates that when the number of times of occurrence of the traffic with the destination organization "C" is equal to or more than five, the traffic is detected as being caused by malware. In FIG. 8, the number of times of occurrence of the traffic with the destination organization "C" is 20 in the traffic caused by malware, and 10 in the network to be protected. Thus, it is evident that the traffic log with the destination organization "C" tends to occur more frequently in the malware's network but seldom occurs in the network to be protected.

The threshold setting unit 135 may also set the threshold for the number of types. For example, in the example of FIG. 10, the threshold for the number of types of the traffic with the destination organization "C" is set to one. Thus, FIG. 10 indicates that when the traffic of a communication pattern with the destination organization "C" occurs even for one type, the traffic is detected as being caused by malware. In FIG. 8, the number of pieces of malware with the destination organization "C" is 20 in the traffic caused by malware, and the number of terminals with the destination organization "C" is one in the traffic of the network to be protected. Thus, it is also evident that the traffic log with the destination organization "C" tends to occur more frequently in the malware's network, but seldom occurs in the network to be protected, from the number of pieces of malware and the number of terminals.

After the thresholds are set, as illustrated in FIG. 11, the identifier setting unit 136 sets a detectable malware identifier using the malicious list candidates and thresholds. FIG. 11 is a diagram illustrating an example of setting a malware identifier for the malicious list candidate. The identifier setting unit 136 applies a malware identifier for identifying the detectable malware when the communication pattern is extracted as the malicious communication pattern.

For example, FIG. 11 indicates that when the threshold for the number of times of occurrence of the traffic with the destination organization "C" is detected as five, or the threshold for the number of types of the same is detected as one, it is possible to detect malware M6 and malware M7. Moreover, when the threshold for the number of times of occurrence of the traffic with the destination IP address "192.0.2.2" is detected as five, or the threshold for the number of types of the same is detected as one, it is possible to detect the malware M6. The identifier setting unit 136 sets the detectable malware identifier by repeating the above process on the malicious list candidates the thresholds of which have already been set.

Figures 12, 13:
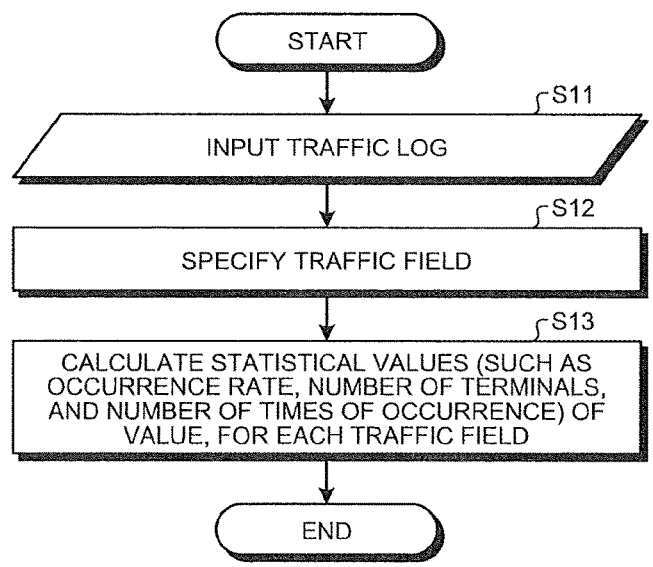
FIG. 12 is a diagram illustrating an example of a malicious list.
FIG. 13 is a flowchart illustrating a statistical value calculation process.

As illustrated in FIG. 12, the malicious list extraction unit 137 extracts the communication pattern applied with the malware identifier that is excluded from the malware identifiers applied to the other communication patterns, as the malicious communication pattern, out of the communication patterns to which the malware identifier is applied by the identifier setting unit 136. FIG. 12 is a diagram illustrating an example of a malicious list.

For example, the malware M6 and the malware M7 that can be detected through detecting the destination organization contain the malware M6 that can be detected through the destination IP address. Thus, the malware M6 and the malware M7 need not be detected through the destination IP address, and are removed as unnecessary detection patterns. The final malicious list can be obtained by performing the above process on the malicious list to which the detectable identifier is applied.

It is to be noted that the setting of the identifier by the identifier setting unit 136 is not essential. The malicious list extraction unit 137 may extract the communication pattern the threshold of which is set by the threshold setting unit 135, as the malicious communication pattern, at the point when the threshold setting unit 135 sets the threshold.

Processing Procedure

Next, a processing procedure performed by the malicious communication pattern extraction device 10 will be described. First, a process performed by the traffic input reception unit 131 and the statistical value calculation unit 132 will be described with reference to FIG. 13. Upon receiving a traffic log (step S11), the traffic input reception unit 131 specifies a traffic field (step S12). The statistical value calculation unit 132 then calculates statistical values for each of the traffic fields being specified (step S13). The statistical values include the occurrence rate, the number of terminals or the number of pieces of malware, the number of times of occurrence, and the like.

Figure 14:
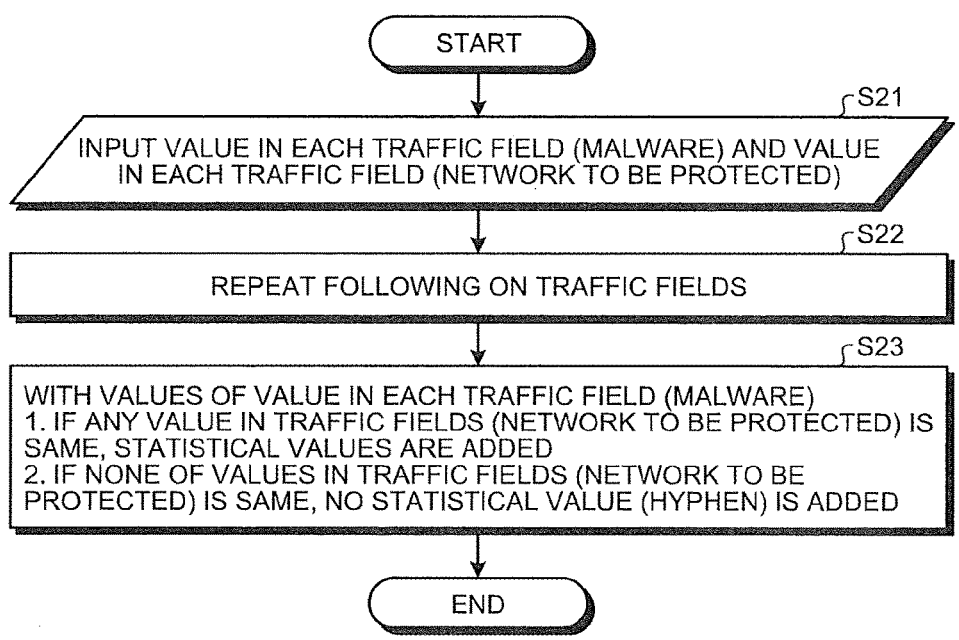
FIG. 14 is a flowchart illustrating a merging process.

A process performed by the merging unit 133 will now be described with reference to FIG. 14. FIG. 14 is a flowchart illustrating a merging process. First, the merging unit 133 receives the values of the traffic fields in the malware execution environment and the values of the traffic fields in the network to be protected that are processed by the statistical value calculation unit 132 (step S21). The merging unit 133 then repeats the merging process on the traffic fields (step S22).

In the merging process, when any of the values corresponding to the traffic field in the malware execution environment also exists in the traffic field in the network to be protected, the value of the traffic field in the network to be protected is added to the value of the traffic field in the malware execution environment. When no value corresponding to the traffic field in the malware execution environment exists in the traffic field in the network to be protected, a hyphen is added to the value of the traffic field in the malware execution environment (step S23).

Figure 15:
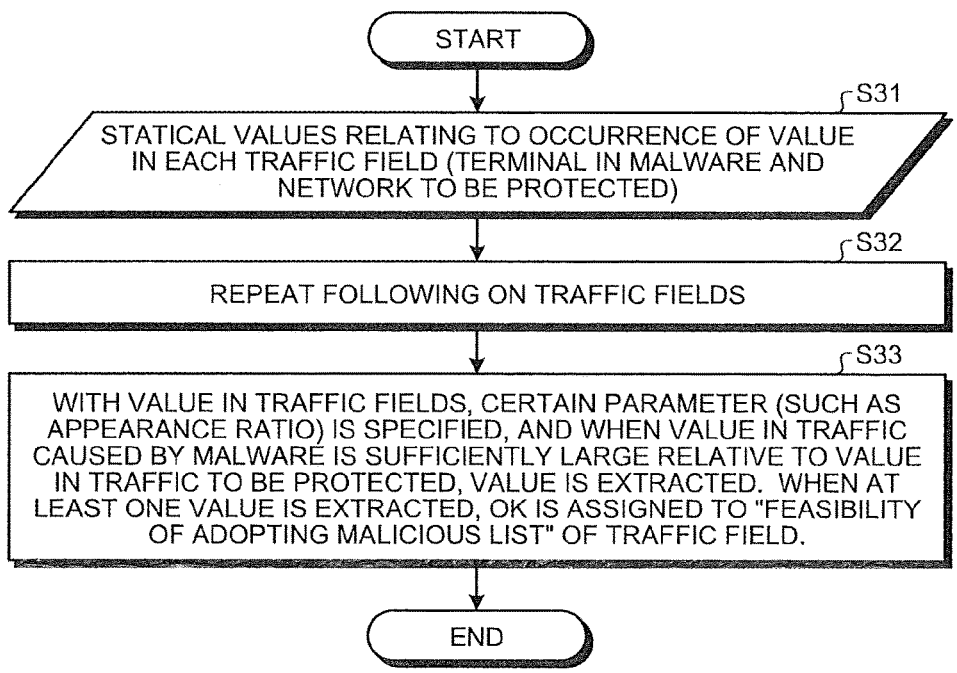
FIG. 15 is a flowchart illustrating a malicious list candidate extraction process.

A process performed by the malicious list candidate extraction unit 134 will now be described with reference to FIG. 15. FIG. 15 is a flowchart illustrating a malicious list candidate extraction process. First, the malicious list candidate extraction unit 134 receives statistical values relating to occurrence of the value in each of the traffic fields that are merged by the merging unit 133 (step S31). The malicious list candidate extraction unit 134 then repeats the malicious list candidate extraction process on the traffic fields (step S32).

In the malicious list candidate extraction process, a statistical value, in other words, a parameter on the value in the traffic field is first specified. When the statistical value in the malware execution environment is sufficiently large enough relative to the statistical value in the network to be protected, the traffic field and the value are extracted as the malicious list candidate. When at least one value satisfying the condition is extracted, OK is assigned to the "feasibility of adopting the malicious list" of the traffic field (step S33).

Figure 16:
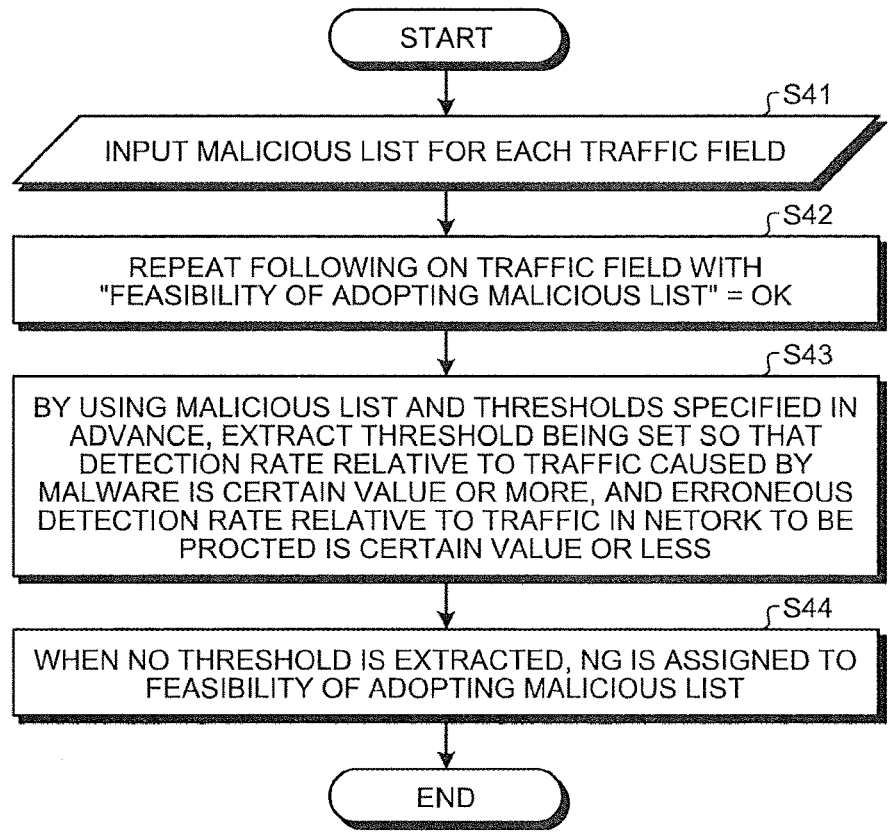
FIG. 16 is a flowchart illustrating a threshold setting process.

A process performed by the threshold setting unit 135 will now be described with reference to FIG. 16. FIG. 16 is a flowchart illustrating a threshold setting process. First, the threshold setting unit 135 receives the malicious list candidate for each of the traffic fields that is extracted by the malicious list candidate extraction unit 134 (step S41). The threshold setting unit 135 then repeats the threshold setting process on the traffic field in which OK is assigned to the "feasibility of adopting the malicious list" (step S42).

In the threshold setting process, a threshold being set so that the detection rate of malware is equal to or more than a certain value, and the error detection rate relative to the traffic in the network to be protected is equal to or less than a certain value is extracted, using the thresholds being specified in advance (step S43). When no threshold can be detected from the thresholds, NG is assigned to the "feasibility of adopting the malicious list" of the traffic field (step S44).

Figure 17:
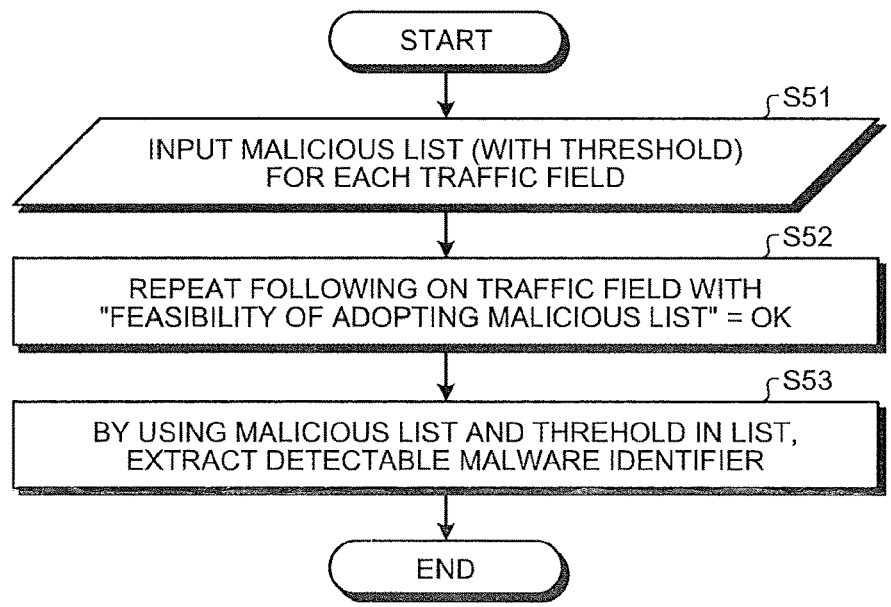
FIG. 17 is a flowchart illustrating an identifier setting process.

A process performed by the identifier setting unit 136 will now be described with reference to FIG. 17. FIG. 17 is a flowchart illustrating an identifier setting process. First, the identifier setting unit 136 receives the malicious list candidate for each of the traffic fields to which the threshold is set by the threshold setting unit 135 (step S51). The identifier setting unit 136 then repeats the identifier setting process on the traffic field in which OK is assigned to the "feasibility of adopting the malicious list" (step S52).

In the identifier setting process, an identifiable malware identifier is extracted using the traffic field and the threshold of the malicious list candidate (step S53).

Figure 18:
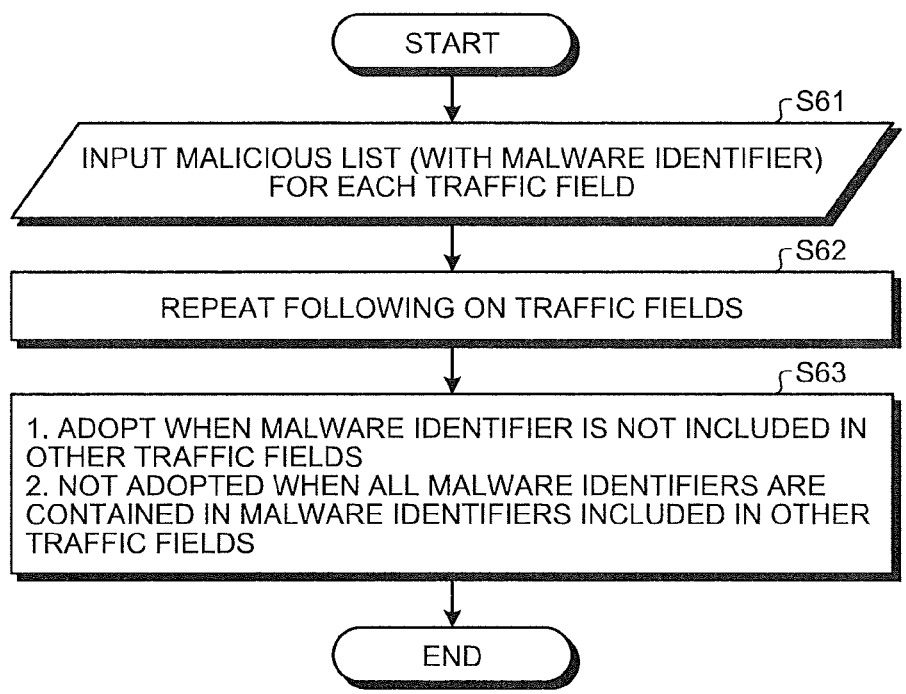
FIG. 18 is a flowchart illustrating a malicious list extraction process.

A process performed by the malicious list extraction unit 137 will now be described with reference to FIG. 18. FIG. 18 is a flowchart illustrating a malicious list extraction process. The malicious list extraction unit 137 receives the malicious list candidate for each of the traffic fields to which the malware identifier is applied by the identifier setting unit 136 (step S61). The malicious list extraction unit 137 then repeats the malicious list extraction process on the traffic fields (step S62).

In the malicious list extraction process, when the malicious list candidate includes a malware identifier that is not included in the other traffic fields, the malicious list candidate is adopted. When the applied identifiers are all contained in the malware identifiers included in the other traffic fields, the malicious list candidate is not adopted (step S63). By performing the above processes, it is possible to obtain the final malicious list.

Program

The process executed by the malicious communication pattern extraction device 10 according to the above embodiment can also be executed by creating a program written in a computer-executable language. In this case, the same effect as that of the above embodiment can be obtained when a computer executes the program. Furthermore, the same process as that of the above embodiment can be implemented by recording the above program in a computer-readable storage medium, and by having a computer read and execute the program stored in the storage medium. In the following, an example of a computer that executes a control program for implementing the same function as that of the malicious communication pattern extraction device 10 will be described.

Figure 19:
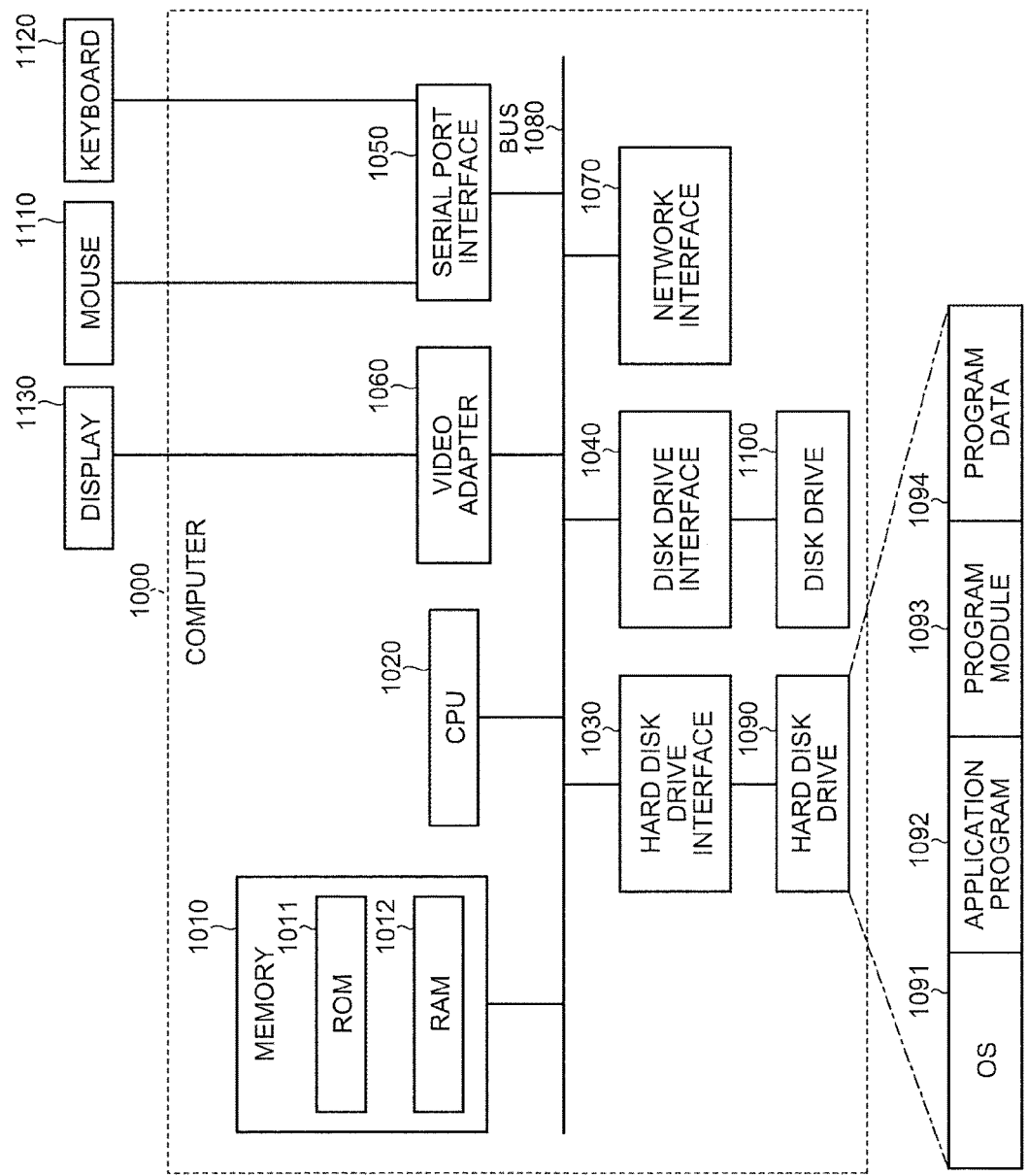
FIG. 19 is a diagram illustrating a computer that executes a malicious communication pattern extraction program.

FIG. 19 is a diagram illustrating a computer that executes a malicious communication pattern extraction program. As illustrated in FIG. 19, for example, a computer 1000 includes a memory 1010, a central processing unit (CPU) 1020, a hard disk drive interface 1030, a disk drive interface 1040, a serial port interface 1050, a video adapter 1060, and a network interface 1070. A bus 1080 connects these units.

The memory 1010 includes a read only memory (ROM) 1011 and a random access memory (RAM) 1012. For example, the ROM 1011 stores therein a boot program such as a basic input output system (BIOS). The hard disk drive interface 1030 is connected to a hard disk drive 1090. The disk drive interface 1040 is connected to a disk drive 1100. For example, a detachable storage medium such as a magnetic disk and an optical disk is inserted into the disk drive 1100. For example, a mouse 1110 and a keyboard 1120 are connected to the serial port interface 1050. For example, a display 1130 is connected to the video adapter 1060.

As illustrated in FIG. 19, the hard disk drive 1090 stores therein an operating system (OS) 1091, an application program 1092, a program module 1093, and program data 1094, for example. The pieces of information described in the above embodiment are stored in the hard disk drive 1090 and the memory 1010, for example.

For example, the malicious communication pattern extraction program is stored in the hard disk drive 1090, as a program module in which instructions executed by the computer 1000 are described. More specifically, the hard disk drive 1090 stores therein the program module in which the processes executed by the malicious communication pattern extraction device 10 explained in the above embodiment are described.

For example, data used for information processing by the malicious communication pattern extraction program is stored in the hard disk drive 1090 as program data. The CPU 1020 reads out the program module 1093 and the program data 1094 stored in the hard disk drive 1090 to the RAM 1012 as necessary, and executes the procedures described above.

The program module 1093 and the program data 1094 according to the malicious communication pattern extraction program are not only stored in the hard disk drive 1090. For example, the program module 1093 and the program data 1094 may be stored in a detachable storage medium and read out by the CPU 1020 via the disk drive 1100 and the like. Alternatively, the program module 1093 and the program data 1094 according to the control program may be stored in another computer connected via a network such as a local area network (LAN) and a wide area network (WAN), and read out by the CPU 1020 via the network interface 1070. Data may also be collected, by allowing the network interface 1070 and the like to collect the packets in real time.

REFERENCE SIGNS LIST 10 malicious communication pattern extraction device
11 input/output unit 12 storage unit
13 control unit
131 traffic input reception unit
132 statistical value calculation unit
133 merging unit
134 malicious list candidate extraction unit
135 threshold setting unit
136 identifier setting unit
137 malicious list extraction unit

The invention claimed is:

1. A malicious communication pattern extraction device that extracts a malicious communication pattern to detect traffic caused by malware, the malicious communication pattern extraction device, comprising:
processing circuitry configured to
receive a first traffic log, from a malware execution environment, obtained from the traffic caused by malware;
receive a second traffic log, from a predetermined communication environment;
calculate a statistical value for an appearance frequency of each of a plurality of communication patterns that is a combination of a field and a value, from the first traffic log, and the second traffic log;
compare between the appearance frequency of the first traffic log and the appearance frequency of the second traffic log for each of the communication patterns, based on the calculated statistical value, and extract the communication pattern as the malicious communication pattern when a difference between both of the appearance frequencies is equal to or more than a predetermined threshold;
set a threshold to detect whether the traffic is caused by malware, when the extracted malicious communication pattern is applied, the threshold being a threshold for number of times the communication pattern is matched with at least one type of the malicious communication pattern, or a threshold for number of types of the malicious communication pattern when the communication pattern is matched with the malicious communication pattern, and the threshold being set so that an erroneous detection rate that is probability of erroneously detecting the traffic caused by malware is equal to or less than a certain value as well as a detection rate that is probability of detecting the traffic caused by malware is equal to or more than a certain value; and
output the extracted malicious communication pattern to an abnormal traffic detection device which receives a traffic log from a network that is connected to the Internet.

2. The malicious communication pattern extraction device according to claim 1
the processing circuitry being configured to
apply a malware identifier for identifying detectable malware to the communication pattern, when the communication pattern is extracted as the malicious communication pattern; and
extract the communication pattern applied with the malware identifier being excluded from the malware identifier applied to another communication pattern, as the malicious communication pattern, out of the communication patterns to which the malware identifier is applied.

3. A malicious communication pattern extraction system, comprising:
a malicious communication pattern extraction device that extracts a malicious communication pattern to detect traffic caused by malware;
a first network that generates a first traffic log obtained from the traffic caused by malware; and
a second network that generates a second traffic log obtained from traffic in a predetermined communication environment, wherein
the malicious communication pattern extraction device includes
processing circuitry configured to
calculate a statistical value for an appearance frequency of each of a plurality of communication patterns that is a combination of a field and a value, from the first traffic log and the second traffic log;
compare between the appearance frequency of the first traffic log and the appearance frequency of the second traffic log for each of the communication patterns, based on the calculated statistical value, and extract the communication pattern as the malicious communication pattern when a difference between both of the appearance frequencies is equal to or more than a predetermined threshold;
set a threshold to detect whether the traffic is caused by malware, when the extracted malicious communication pattern is applied, the threshold being a threshold for number of times the communication pattern is matched with at least one type of the malicious communication pattern, or a threshold for number of types of the malicious communication pattern when the communication pattern is matched with the malicious communication pattern, and the threshold being set so that an erroneous detection rate that is probability of erroneously detecting the traffic caused by malware is equal to or less than a certain value as well as a detection rate that is probability of detecting the traffic caused by malware is equal to or more than a certain value; and
output the extracted malicious communication pattern to an abnormal traffic detection device which receives a traffic log from a network that is connected to the Internet.

4. A malicious communication pattern extraction method, implemented by a malicious communication pattern extraction device, that extracts a malicious communication pattern to detect traffic caused by malware, the malicious communication pattern extraction method, comprising:
receiving a first traffic log, from a malware execution environment, obtained from the traffic caused by malware;
receiving a second traffic log, from a predetermined communication environment;
calculating a statistical value for an appearance frequency of each of a plurality of communication patterns that is a combination of a field and a value, from the first traffic log, and the second traffic log;
comparing between the appearance frequency of the first traffic log and the appearance frequency of the second traffic log for each of the communication patterns, based on the calculated statistical value, and extracting the communication pattern as the malicious communication pattern when a difference between both of the appearance frequencies is equal to or more than a predetermined threshold;

setting a threshold to detect whether the traffic is caused by malware, when the extracted malicious communication pattern is applied, the threshold being a threshold for number of times the communication pattern is matched with at least one type of the malicious communication pattern, or a threshold for number of types of the malicious communication pattern when the communication pattern is matched with the malicious communication pattern, and the threshold being set so that an erroneous detection rate that is probability of erroneously detecting the traffic caused by malware is equal to or less than a certain value as well as a detection rate that is probability of detecting the traffic caused by malware is equal to or more than a certain value; and outputting the extracted malicious communication pattern to an abnormal traffic detection device which receives a traffic log from a network that is connected to the Internet.

5. A non-transitory computer-readable recording medium having stored a malicious communication pattern extraction program that causes a computer to extract a malicious communication pattern to detect traffic caused by malware, the malicious communication pattern extraction program causes a computer to execute a process, comprising:

receiving a first traffic log, from a malware execution environment, obtained from the traffic caused by malware;

receiving a second traffic log, from a predetermined communication environment;

calculating a statistical value for an appearance frequency of each of a plurality of communication patterns that is a combination of a field and a value, from the first traffic log, and the second traffic log;

comparing between the appearance frequency of the first traffic log and the appearance frequency of the second traffic log for each of the communication patterns, based on the calculated statistical value, and extracting the communication pattern as the malicious communication pattern when a difference between both of the appearance frequencies is equal to or more than a predetermined threshold;

setting a threshold to detect whether the traffic is caused by malware, when the extracted malicious communication pattern is applied, the threshold being a threshold for number of times the communication pattern is matched with at least one type of the malicious communication pattern, or a threshold for number of types of the malicious communication pattern when the communication pattern is matched with the malicious communication pattern, and the threshold being set so that an erroneous detection rate that is probability of erroneously detecting the traffic caused by malware is equal to or less than a certain value as well as a detection rate that is probability of detecting the traffic caused by malware is equal to or more than a certain value; and outputting the extracted malicious communication pattern to an abnormal traffic detection device which receives a traffic log from a network that is connected to the Internet.

* * * * *